United States Patent
Komaki

(10) Patent No.: US 8,508,756 B2
(45) Date of Patent: Aug. 13, 2013

(54) IMAGE FORMING APPARATUS HAVING CAPABILITY FOR RECOGNITION AND EXTRACTION OF ANNOTATIONS AND ADDITIONALLY WRITTEN PORTIONS

(75) Inventor: Yoshio Komaki, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1374 days.

(21) Appl. No.: 12/004,201

(22) Filed: Dec. 20, 2007

(65) Prior Publication Data

US 2008/0174815 A1    Jul. 24, 2008

(30) Foreign Application Priority Data

Dec. 28, 2006   (JP) .................................. 2006-355933
Nov. 13, 2007   (JP) .................................. 2007-294593

(51) Int. Cl.
*G06F 3/12* (2006.01)

(52) U.S. Cl.
USPC ....................................................... 358/1.13

(58) Field of Classification Search
None
See application file for complete search history.

(56) References Cited

U.S. PATENT DOCUMENTS

| | | | |
|---|---|---|---|
| 5,634,064 A | 5/1997 | Warnock et al. | |
| 2002/0102022 A1* | 8/2002 | Ma et al. | 382/170 |
| 2003/0004991 A1* | 1/2003 | Keskar et al. | 707/512 |
| 2006/0224950 A1 | 10/2006 | Takaai et al. | |

FOREIGN PATENT DOCUMENTS

| | | |
|---|---|---|
| JP | 6-162109 | 6/1994 |
| JP | 2002-319025 | 10/2002 |
| JP | 2006-277167 | 10/2006 |

OTHER PUBLICATIONS

"Chapter 7—Interactive Features," PDF Reference: Adobe Portable Document Format, Version 1.3, second ed., Adobe Systems Incorporated, Addison-Wesley, dated Jul. 2000, pp. 383-472.
Japanese Office Action for Japanese Patent Application No. 2007-294593 dated May 22, 2012 with translation.

* cited by examiner

*Primary Examiner* — Jeremiah Bryar
(74) *Attorney, Agent, or Firm* — Brinks Hofer Gilson & Lione

(57) ABSTRACT

To convert a source document having an additionally-handwritten portion into PDF data, an image forming apparatus scans the source document and reads it, and extracts an additionally-written region from image data. Additionally, based on a position of the additionally-written region, the image forming apparatus sets an annotation frame, which is a size of a region on the PDF data for inserting the additionally-written region into the PDF data as an annotation, and a position where the data is displayed.

12 Claims, 16 Drawing Sheets

FIG.4

ABCDEFGHIJ、KLMNOPQ、R
ABCDEFGHIJKLMNOPQR           ⊙ ~101

ABCDEFGHHJKLMN
ABCDTACEFGHIJKL
abcdefghikkkmn
opqrstu、ABCDEFG    ATTN ~103
vwxyzABCD、EFGHH   ~105
JKLMNOPQRSTUVW
XYZ、abcdefghkkk
lmn.

BOUNDARY BOX 205B  205A  203

FIG.17

| | COMMENT | POSITION | TYPE | TRANSPARENCY | ATTACHED DATA |
|---|---|---|---|---|---|
| ANNOTATION 1 | "UNDERLINE MARKER" | (100,260),(24,280) | RECTANGULAR | 0% | (NONE) |
| ANNOTATION 2 | "UNDERLINE MARKER" | (220,220),(330,240) | RECTANGULAR | 0% | (NONE) |
| ANNOTATION 3 | "MARKER" | (460,50),(530,120) | RECTANGULAR | 0% | (NONE) |
| ANNOTATION 4 | "HANDWRITTEN" | (330,180),(500,230) | STAMP | 100% | BIT MAP DATA |

IMAGE FORMING APPARATUS HAVING CAPABILITY FOR RECOGNITION AND EXTRACTION OF ANNOTATIONS AND ADDITIONALLY WRITTEN PORTIONS

This application is based on Japanese Patent Applications Nos. 2006-355933 and 2007-294593 filed with the Japan Patent Office on Dec. 28, 2006 and on Nov. 13, 2007, respectively, the entire content of which is hereby incorporated by reference.

BACKGROUND OF THE INVENTION

1. Field of the Invention

The present invention relates to an image forming apparatus, a method of creating electronic document data, and a computer-readable medium that records an electronic document data creation program, and particularly relates to an image forming apparatus, a method of creating electronic document data, and a computer-readable medium that records an electronic document data creation program, all of which create data in an electronic document format from document image data, to which data in an electronic format an annotation for browsing can be written.

2. Description of the Related Art

There conventionally exists an image forming apparatus provided with a scanner that reads an image of a source document, and creates an electronic document in a Portable Document Format (PDF), for example, from image data obtained by scanning a paper-medium source document. An example of such an image forming apparatus is a Multi Function Peripheral (MFP).

The above-described electronic document can be browsed with the use of an application corresponding thereto. If the electronic document is widely-used PDF data, it can be browsed with the use of Acrobat Reader or a Web browser, which serves as an application that operates in a personal computer (PC), a viewer that operates in a mobile telephone, a viewer that operates in electronic paper, or the like.

When a paper-medium source document is browsed, it is common that comments, markers, and others are additionally written thereto by handwriting. Such additionally-handwritten information can reduce time and effort to search for a necessary section in the case of subsequent browsing. Furthermore, such information can indicate a section one wishes other persons to browse, and hence is often useful as well when other persons browse the same source document.

There conventionally exists an image forming apparatus that reads handwritten information such as a marker on a paper-medium source document. Specifically, examples thereof include an image forming apparatus capable of reading an additionally-handwritten portion such as a marker on a source document in accordance with an instruction by utilizing an Optical Character Reader (OCR) function, an image forming apparatus that executes specific image processing on the relevant portion in accordance with an instruction, and other apparatuses. In other words, each of the conventional image forming apparatuses executes processing on an additionally-written portion in accordance with an instruction.

For example, Japanese Laid-Open Patent Publication No. 06-162109 (hereinafter referred to as Document 1) discloses an electronic filing system capable of designating a keyword for search with the use of a marker.

However, when an electronic document produced from image data obtained by scanning a paper-medium source document is browsed, each of the above-described conventional image forming apparatuses such as the system disclosed in Document 1 fails to support browsing of an additionally-handwritten portion such as a marker on the source document. Accordingly, there arises a problem of not being able to achieve particularly high browsing capability in the additionally-handwritten portion such as a marker on the source document.

SUMMARY OF THE INVENTION

The present invention is made in view of these problems. An object of the present invention is to provide an image forming apparatus, a method of creating electronic document data, and a computer-readable medium recording an electronic document data creation program, all of which create, from a source document including an additionally-handwritten portion, electronic document data with high browsing capability, without the need of a complicated manipulation to the apparatus.

In order to achieve the above-described object, according to an aspect of the present invention, an image forming apparatus includes: read unit reading an image of a source document and obtaining image data; electronic document production unit producing electronic document data for allowing a display apparatus to display the image data thereon, based on the image data; an extraction unit extracting from the image data an additionally-written region including an additionally-handwritten portion; a production unit producing annotation data based on the additionally-written region; and a setting unit calculating a position for allowing the display apparatus to display the annotation data on the electronic document data, based on a position of the additionally-written region on the image data, and setting the calculated position for the annotation data.

The image forming apparatus according to the present invention can create the electronic document data with high browsing capability from the source document including an additionally-handwritten portion, without the need of a complicated manipulation.

According to another aspect of the present invention, a method of creating electronic document data is a method of creating electronic document data based on image data obtained by reading an image of a source document, and includes the steps of: extracting from the image data an additionally-written region including an additionally-handwritten portion; producing annotation data based on the additionally-written region; and calculating a position for allowing a display apparatus to display the annotation data on the electronic document data, based on a position of the additionally-written region on the image data, and setting the calculated position for the annotation data.

According to still another aspect of the present invention, a computer readable medium records an electronic document data creation program causing a computer to execute electronic document data creation processing of creating electronic document data based on image data obtained by reading an image of a source document. The electronic document data creation program causes the computer to execute the steps of: extracting from the image data an additionally-written region including an additionally-handwritten portion; producing annotation data based on the additionally-written region; and calculating a position for allowing a display apparatus to display the annotation data on the electronic document data, based on a position of the additionally-written region on the image data, and setting the calculated position for the annotation data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a drawing that shows a practical example of a source document having an additionally-written portion.

FIG. 17 is a drawing that shows a practical example of annotation data.

DESCRIPTION OF THE PREFERRED EMBODIMENTS

Figure 1:
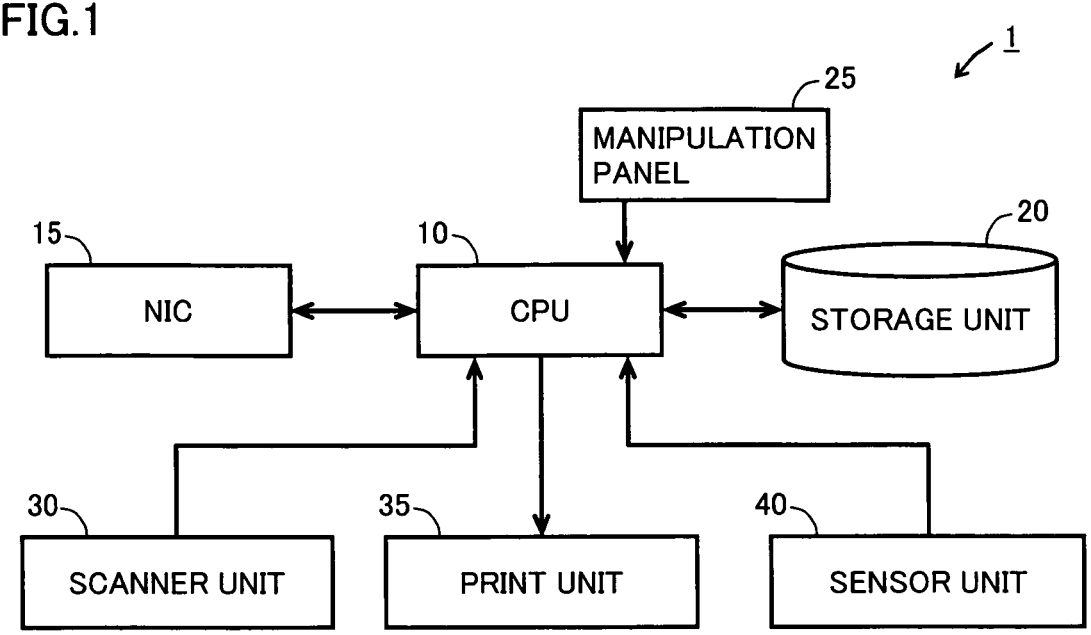
FIG. 1 is a block diagram showing a practical example of a hardware configuration of an image forming apparatus according to an embodiment.

An embodiment of the present invention will hereinafter be described with reference to the drawings. In the following description, the same parts and components are provided with the same reference characters, and have the same names and functions as well.

FIG. 1 is a block diagram showing a practical example of a hardware configuration of an image forming apparatus 1 according to the present embodiment. A copy machine, a printer, a Multi Function Peripheral (MFP) identified as the composite equipment thereof, and others serve as image forming apparatus 1. It is assumed in the present embodiment that image forming apparatus 1 is an MFP having both of a scanner function and a print function. FIG. 1 shows a practical example of a hardware configuration of image forming apparatus 1, which is an MFP. Although an MFP serves as image forming apparatus 1 in the present embodiment, another apparatus as described above may serve as image forming apparatus 1. Alternatively, image forming apparatus 1 may be in the form of a combination of a plurality of apparatuses, such as a combination of an apparatus with a scanner function and an apparatus with a print function.

With reference to FIG. 1, image forming apparatus 1 includes a Central Processing Unit (CPU) 10 that controls the entire apparatus, a scanner unit 30 that optically reads a source document and converts the obtained analog data into image data identified as digital data, a print unit 35 that forms an image for printing from the image data and prints the image on a sheet, a Network Interface Card (NIC) 15 that is an expansion card for connecting image forming apparatus 1 to a network or a telephone line, or for establishing short-distance radio communication, a storage unit 20 that is composed of a Hard Disk (HD), Random Access Memory (RAM), or the like, for storing a job, an electronic document data creation program and the like to be executed by CPU 10, a manipulation panel 25 that serves as an interface with a user, and a sensor unit 40 that detects a remaining amount of a consumable article and others.

Figure 2:
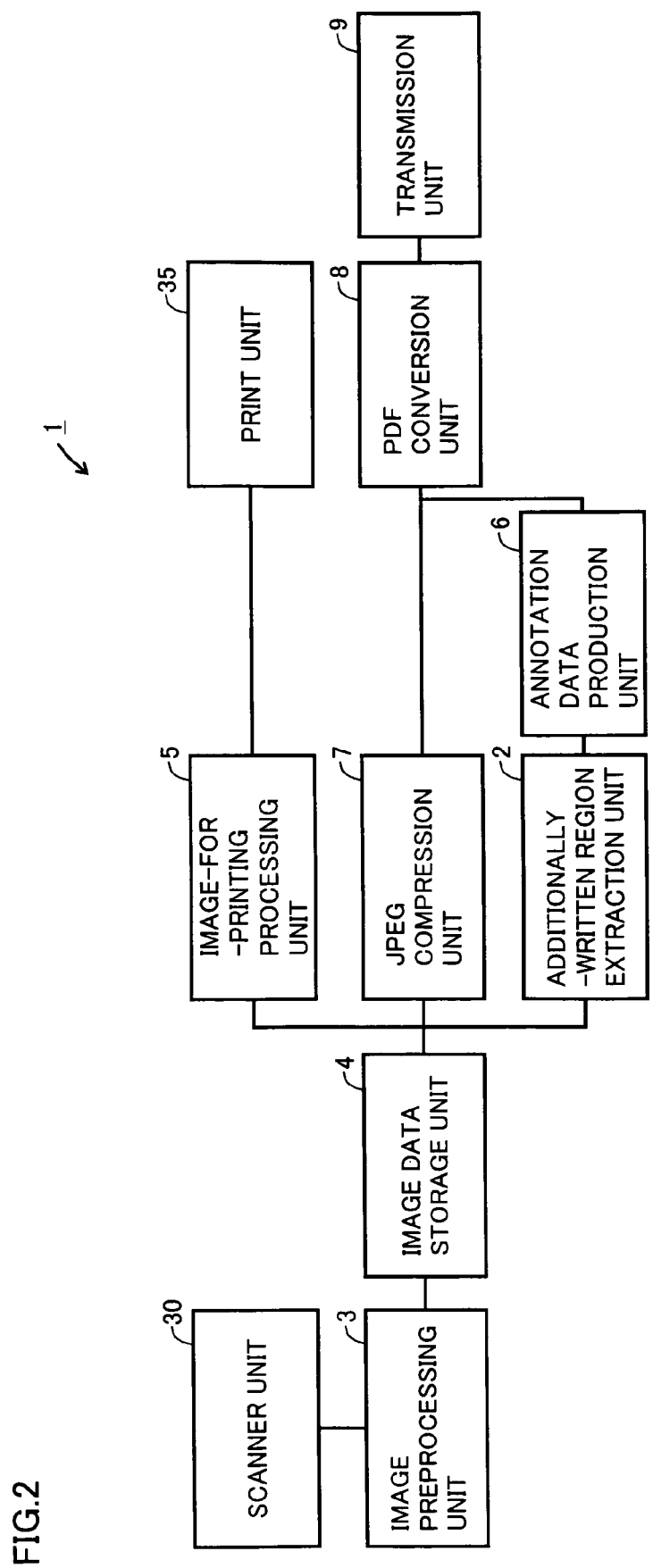
FIG. 2 is a block diagram showing a practical example of a functional configuration of the image forming apparatus according to the embodiment.

FIG. 2 is a block diagram showing a practical example of a functional configuration for creating the electronic document data from a paper-medium source document in image forming apparatus 1 according to the present embodiment. It is assumed in the present embodiment that Portable Document Format (PDF) data, which achieves widespread use as electronic document data, is to be created. Electronic document data to be created is of course not limited to the PDF data, and may be data in another form such as data described in a Hypertext Markup Language (HTML). Each function shown in FIG. 2 is the one mainly formed on CPU 10 by CPU 10 executing the electronic document data creation program stored in storage unit 20. At least a part of the functions may also be formed by the hardware configuration shown in FIG. 1.

With reference to FIG. 2, the above-described functions of image forming apparatus 1 include an image preprocessing unit 3 that executes preprocessing on the image data converted in scanner unit 30, an image data storage unit 4, an image-for-printing processing unit 5, a Joint Photographic Experts Group (JPEG) compression unit 7, an additionally-written region extraction unit 2, an annotation data production unit 6, a PDF conversion unit 8, and a transmission unit 9.

Image preprocessing unit 3 subjects the image data converted in scanner unit 30 to preprocessing. A practical example of the preprocessing can include processing of converting the image data converted in scanner unit 30, into Red Green Blue (RGB) image data suitable for being displayed by a viewer. Another practical example of the preprocessing can also include processing of correcting the image data converted in scanner unit 30 by using property information about scanner unit 30. The processed image data is stored in image data storage unit 4.

Image-for-printing processing unit 5 reads image data to be printed from image data storage unit 4, in accordance with a manipulation signal based on a manipulation with the use of manipulation panel 25. Image-for-printing processing unit 5 subjects the read image data to image-for-printing processing, and inputs the processed image data to print unit 35. The converted image data is printed on a paper medium in print unit 35. The image-for-printing processing is processing of converting the read image data into image data suitable for printing. A practical example of the image-for-printing processing can include processing of converting the RGB image data, which is the read image data, into Yellow Magenta Cyan Black (YMCK) image data.

JPEG compression unit 7 reads image data to be processed from image data storage unit 4, in accordance with a manipulation signal based on a manipulation with the use of manipulation panel 25. JPEG compression unit 7 subjects the read image data to compression processing such that the read image data is made into image data in the JPEG form, and inputs the processed image data in the JPEG form to PDF conversion unit 8.

Additionally-written region extraction unit 2 reads the image data to be processed from image data storage unit 4, in accordance with the manipulation signal based on the manipulation with the use of manipulation panel 25. Additionally-written region extraction unit 2 analyzes the read image data and extracts an additionally-written region, which is a region that includes a portion additionally handwritten to the source document. Annotation data production unit 6 produces annotation data to be inserted into PDF data, based on the extracted, additionally-written region, and inputs the annotation data to PDF conversion unit 8. The "annotation" herein refers to a markup that is produced by utilizing an electronic document creation/editing application function, and is to be electrically inserted into the electronic document data. Note that the technique of an annotation of PDF data or the like is described in detail in the following reference materials.

U.S. Pat. No. 5,634,064

"Pdf Reference: Adobe Portable Document Format, Version 1.3", ADDISON-WESLEY, First printing: July 2000

PDF conversion unit 8 is a function composed of a function of an application for creating/editing PDF data. PDF conversion unit 8 produces PDF data from the image data in the JPEG form, which has been input from JPEG compression unit 7, and the annotation data, which has been input from annotation data production unit 6, and inputs the PDF data to transmission unit 9.

Transmission unit 9 transmits the input PDF data to a transmission destination designated by the manipulation signal based on the manipulation with the use of manipulation panel 25, in accordance with one of various communication protocols. Examples of the communication protocol can include a Server Message Block (SMB), a File Transfer Protocol (FTP), a Hypertext Transfer Protocol (HTTP), a Simple Mail Transfer Protocol (SMTP), and others.

Figure 3:
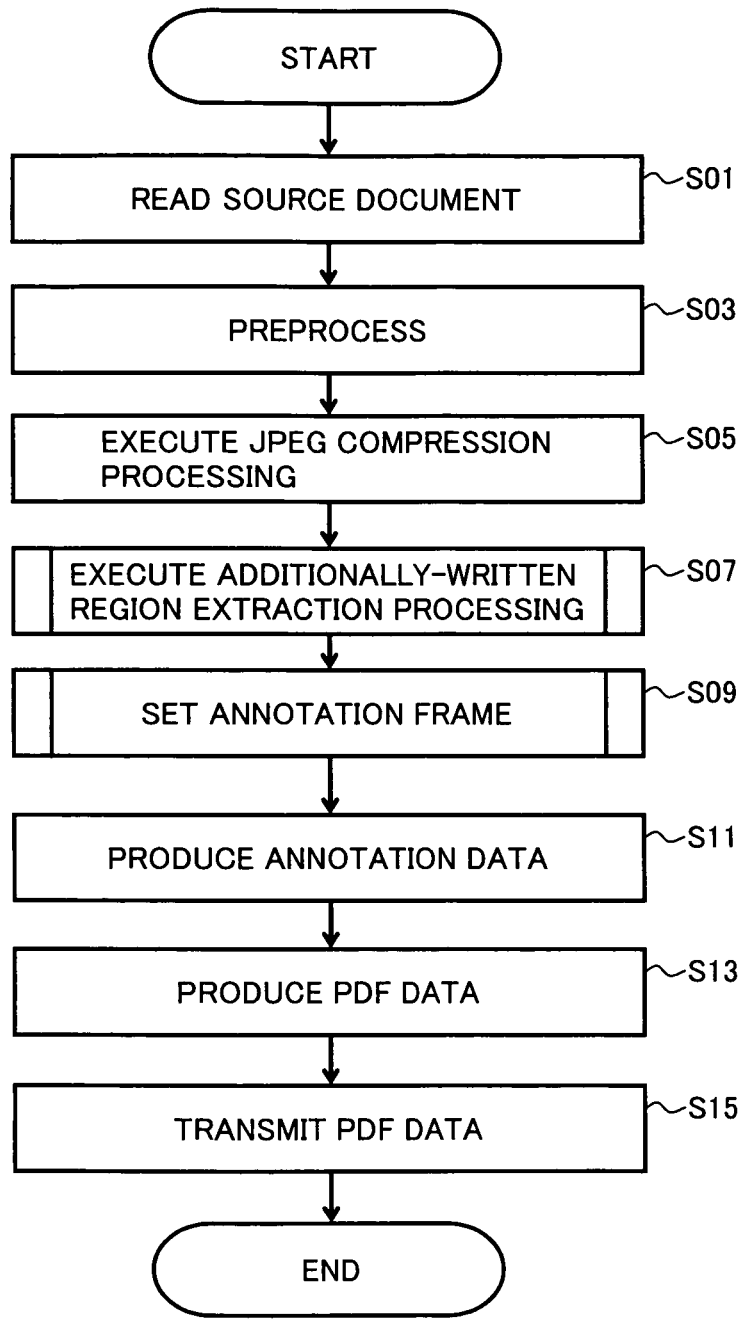
FIG. 3 is a flowchart showing a practical flow of electronic document data creation processing in the image forming apparatus according to the embodiment.

FIG. 3 is a flowchart showing a practical flow of the electronic document data creation processing in image forming apparatus 1 according to the present embodiment. The processing shown in the flowchart in FIG. 3 is implemented by CPU 10 reading and executing the electronic document data creation program stored in storage unit 20, and controlling each of the functions shown in FIG. 2. There will be herein provided a specific description, assuming that a source document to be processed is the source document shown in FIG. 4. The source document shown in FIG. 4 is a practical example of a horizontally-written source document that includes characters created by using a standard font incorporated in a PC or the like. Although characters in the source document are mainly Japanese characters in FIG. 4, the same applies to any of alphabets, numeric characters, and others. Furthermore, additionally-written portions 101, 103 and 105, which are added to the original source document by handwriting, are also included. Additionally-written portion 101 is specifically a marker 101 such as a sign written with a red, bold-line pen. Additionally-written portion 103 is specifically an additionally-handwritten portion 103 written with a red, thin-line pen. Additionally-written portion 105 is specifically an underline 105 drawn with a blue, bold-line pen. In the following description, the additionally-written portion such as a sign written with a bold-line pen is referred to as a "marker". The color of a bold-line pen (red and blue in the practical example shown in FIG. 4) is referred to as a "marker color". The additionally-written portion such as a character or a sign written with a writing material other than a bold-line pen is referred to as an "additionally-handwritten portion". The underline drawn with a bold-line pen is referred to as an "underline" or an "underline marker".

With reference to FIG. 3, scanner unit 30 initially scans a source document set on a source document table and obtains image data (step S01). The obtained image data is subjected to preprocessing in image preprocessing unit 3 (step S03), and stored in image data storage unit 4. As an example of step S03, image preprocessing unit 3 determines an upside and a downside of the source document, and (if the source document is horizontally written,) executes rotation processing by which a character row is horizontally arranged. The image data stored in image data storage unit 4 is subjected to compression processing in JPEG compression unit 7 as needed, and converted into image data in the JPEG form (step S05).

Figure 5:
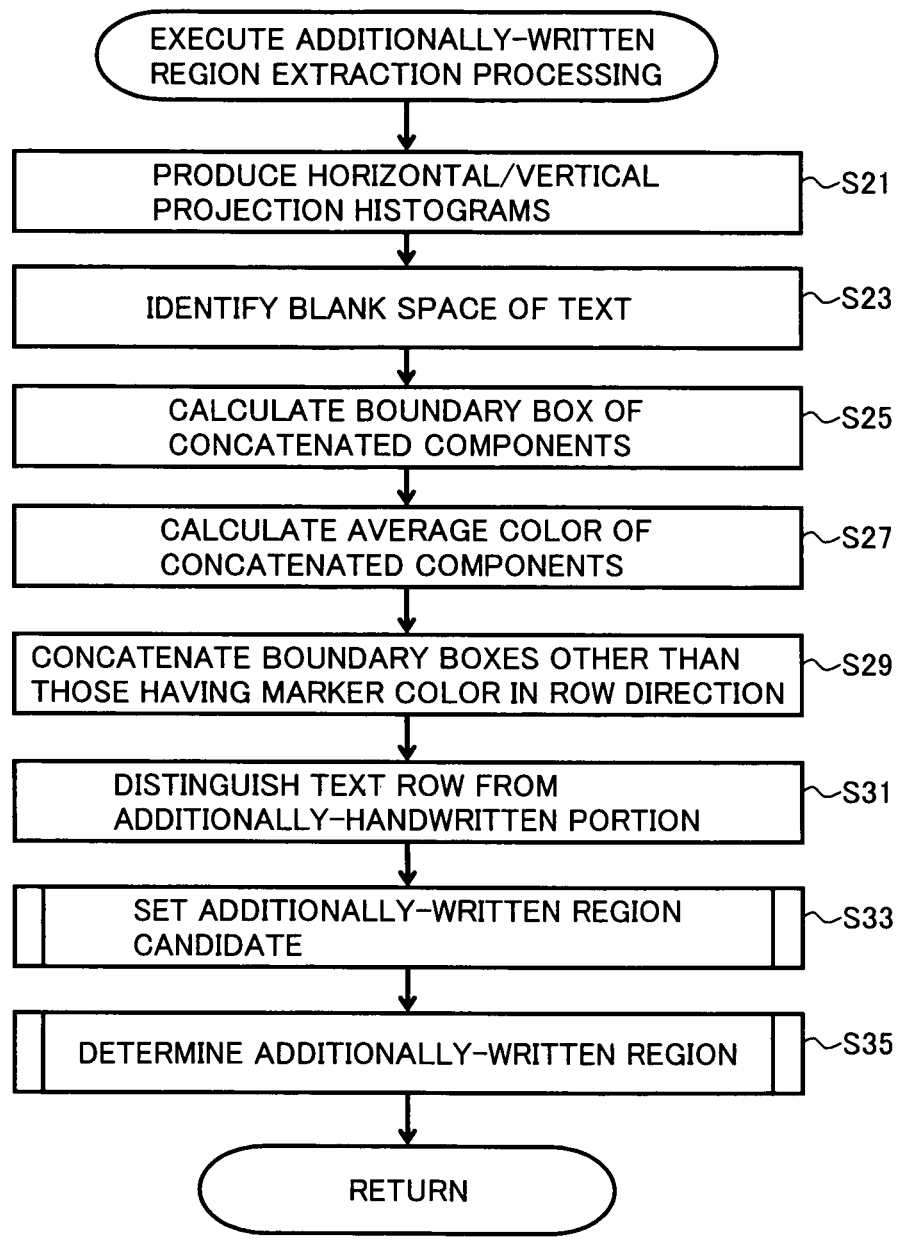
FIG. 5 is a flowchart showing a practical example of additionally-written region extraction processing in step S07.

Next, additionally-written region extraction unit 2 executes processing of extracting an additionally-written region, which is a region additionally written to the source document by handwriting or the like (step S07). In the present invention, the processing here is not limited to particular processing, and any processing method may be adopted. As an example, the processing disclosed in Japanese Laid-Open Patent Publication No. 2002-319025 can be adopted. Specifically, with reference to FIG. 5, additionally-written region extraction unit 2 produces from the image data obtained in the above-described step S01 a horizontal projection histogram and a vertical projection histogram (step S21). Based on the horizontal and vertical projection histograms produced in the above-described step S21, additionally-written region extraction unit 2 identifies a blank space in the source document (step S23).

Figure 6:
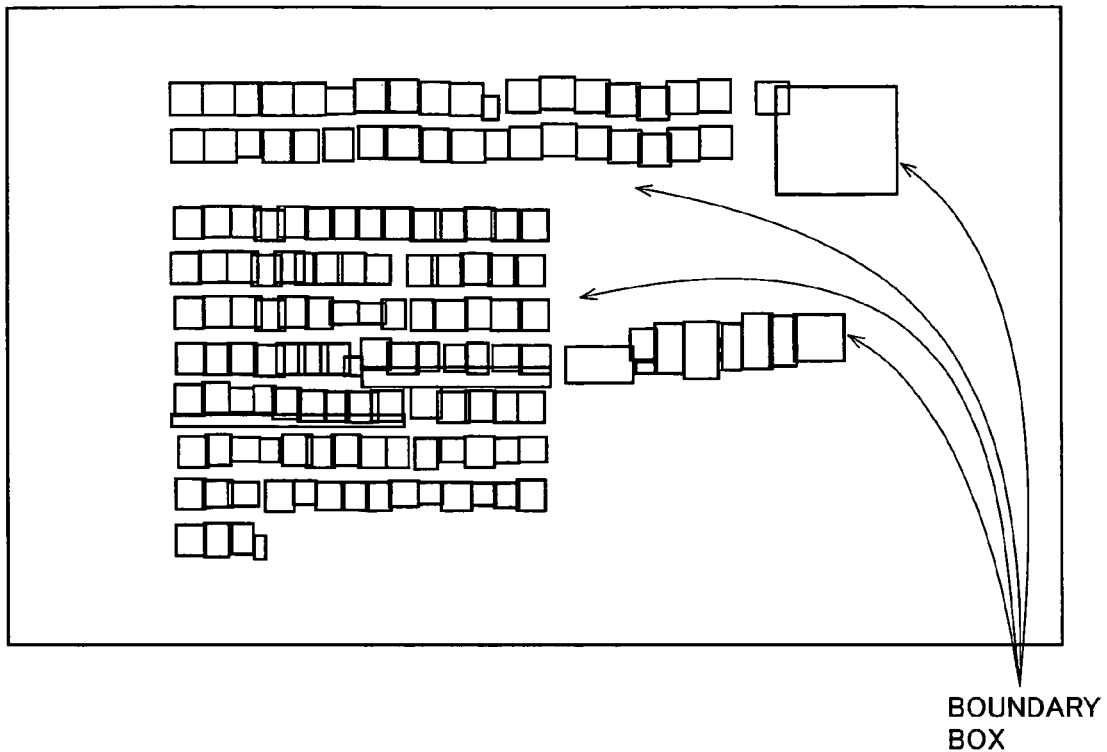
FIG. 6 is a drawing that shows a practical example of a boundary box in a character region.

Furthermore, additionally-written region extraction unit 2 analyzes concatenated components in the image data obtained in the above-described step S01, and calculates a boundary box in a character region (step S25). Here, if a source document read in the above-described step S01 is the one shown in FIG. 4, boundary boxes in the character region, as shown in FIG. 6, are calculated in step S25. Then an average color of concatenated components is calculated as a characteristic amount for each of the boundary boxes. The average color, which is a calculated characteristic amount, is saved as an attribute of the boundary box (step S27).

Next, if both average colors, each of which is calculated in step S27 as an attribute, of two boundary boxes adjacent to each other in a row direction are not marker colors, and if these boundary boxes satisfy a prescribed condition, additionally-written region extraction unit 2 concatenates these two boundary boxes (step S29). Two or more of the boundary boxes concatenated in the row direction are hereinafter referred to as a "merged text row". The prescribed condition described above is a condition as to an upper end position and a height of each of two boundary boxes adjacent to each other in the row direction, and a horizontal distance therebetween, and is a condition indicating that these boundary boxes are a series of characters. In step S29, the processing of merging two boundary boxes that satisfy the prescribed condition above is repeated. Merged text rows are thereby created.

Figure 7:
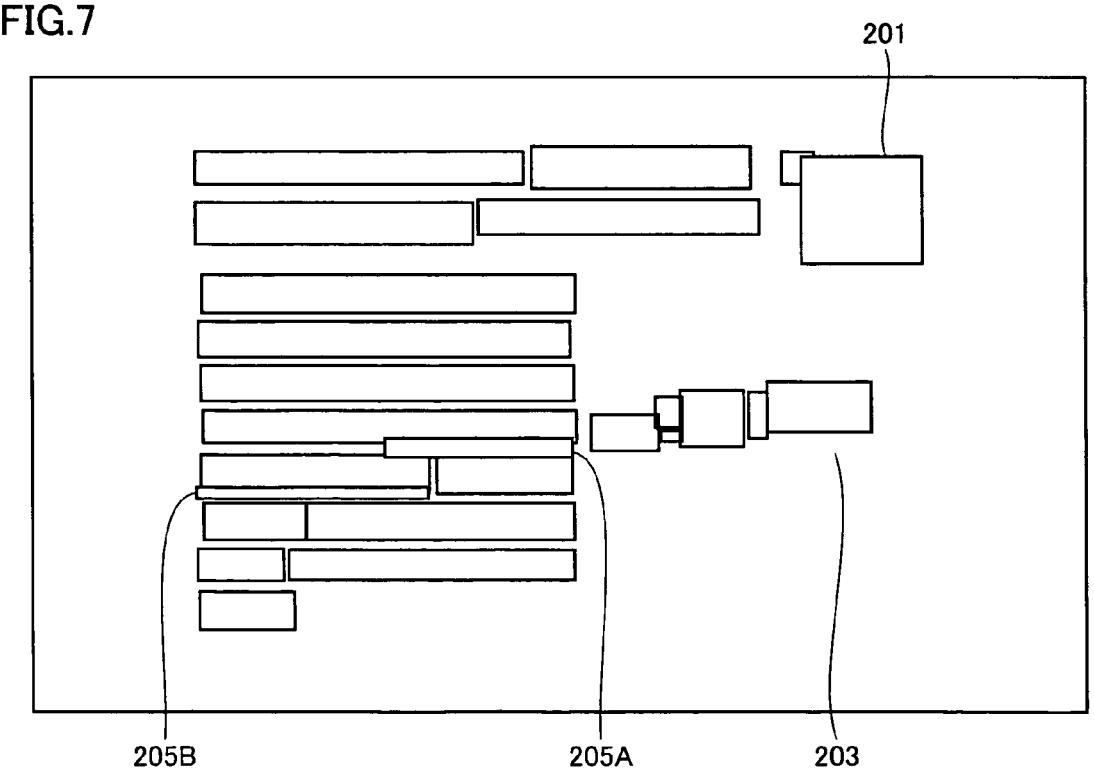
FIG. 7 is a drawing that shows a practical example of a merged text row.

After the boundary boxes shown in FIG. 6 are calculated in the above-described step S27, merged text rows as shown in FIG. 7 are created in step S29. In FIG. 7, an average color, which is an attribute, of a boundary box 201 corresponding to marker 101 in FIG. 4 is red, which is a marker color of marker 101. An average color, which is an attribute, of boundary boxes 205A and 205B corresponding to underline 105 in FIG. 4 is blue, which is a marker color of underline 105. Accordingly, these boundary boxes 201, 205A and 205B are not concatenated in step S29. Furthermore, a group 203 of boundary boxes that corresponds to additionally-handwritten portion 103 in FIG. 4 fails to satisfy the prescribed condition above, and hence the boundary boxes therein are not concatenated.

Figure 8:
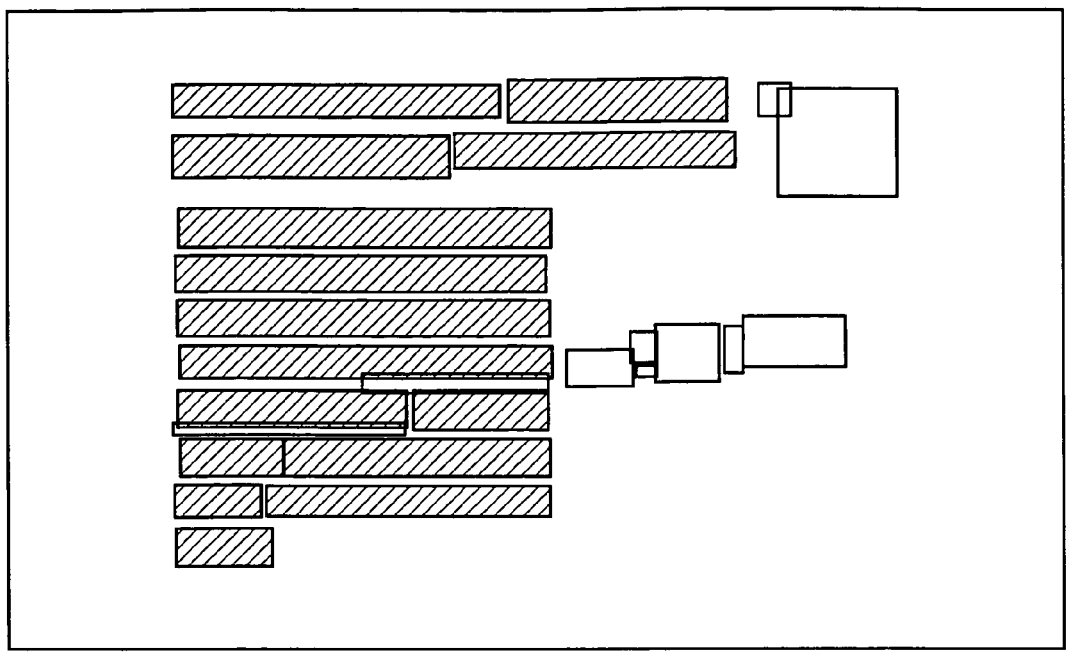
FIG. 8 is a drawing that shows a practical example of the merged text rows representing a text region.

Next, additionally-written region extraction unit 2 compares the projection histograms produced in step S21 with the merged text rows obtained in step S29, and distinguishes a text row from an additionally-written portion by handwriting or the like. Thus additionally-written region extraction unit 2 identifies merged text rows representing text, on the source document (step S31). In step S31, merged text rows located in positions corresponding to peaks of each of the projection histograms is identified as merged text rows representing text. As to the merged text rows shown in FIG. 7, the merged text rows shown in FIG. 8 in a hatched manner are identified as merged text rows representing a text region, which corresponds to printed characters on the source document.

Figure 9:
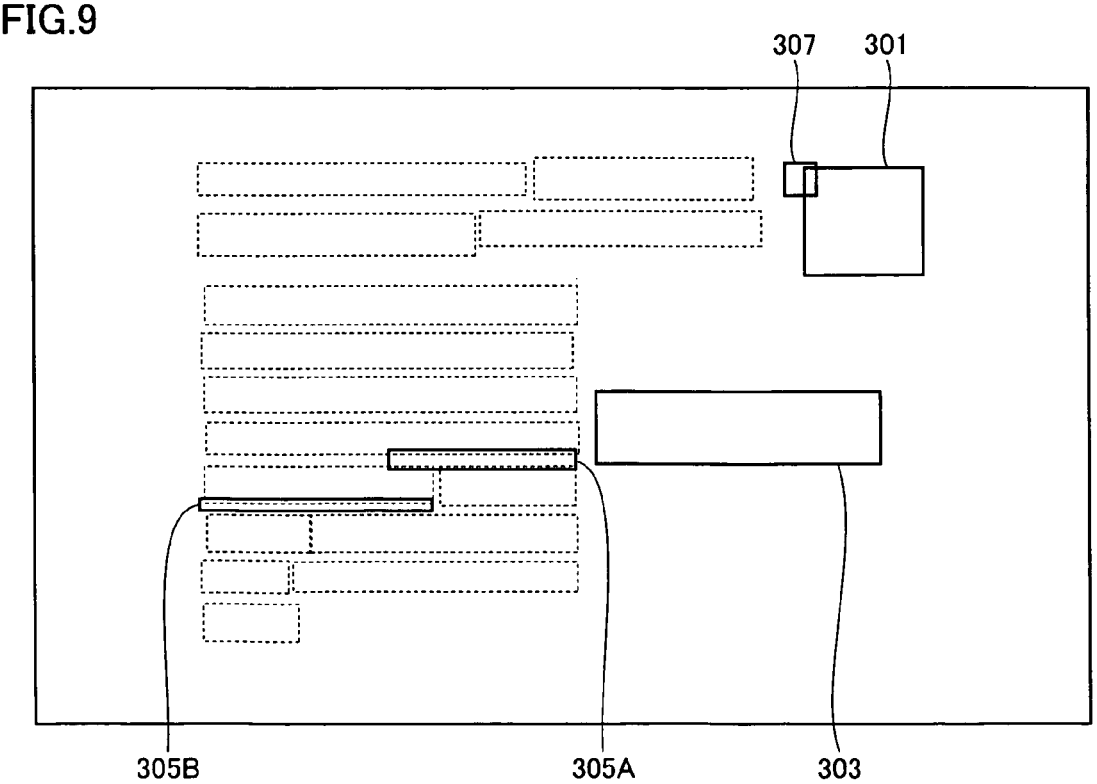
FIG. 9 is a drawing that shows a practical example of an additionally-written region candidate.

Next, as to boundary boxes other than the merged text rows identified in the above-described step S31 as the merged text rows representing text, additionally-written region extraction unit 2 sets a region that includes boundary boxes having the same attribute and located within a prescribed distance, as an additionally-written region candidate (step S33). In the present practical example, five regions shown by bold frames in FIG. 9 are set as additionally-written region candidates. Specifically in FIG. 9, a region 301 including boundary box 201 in FIG. 7, a region 303 including group 203 of boundary boxes in FIG. 7, a region 305A including boundary box 205A in FIG. 7, a region 305B including boundary box 205B in FIG. 7, and a region 307 are set as additionally-written region candidates.

Figure 10:
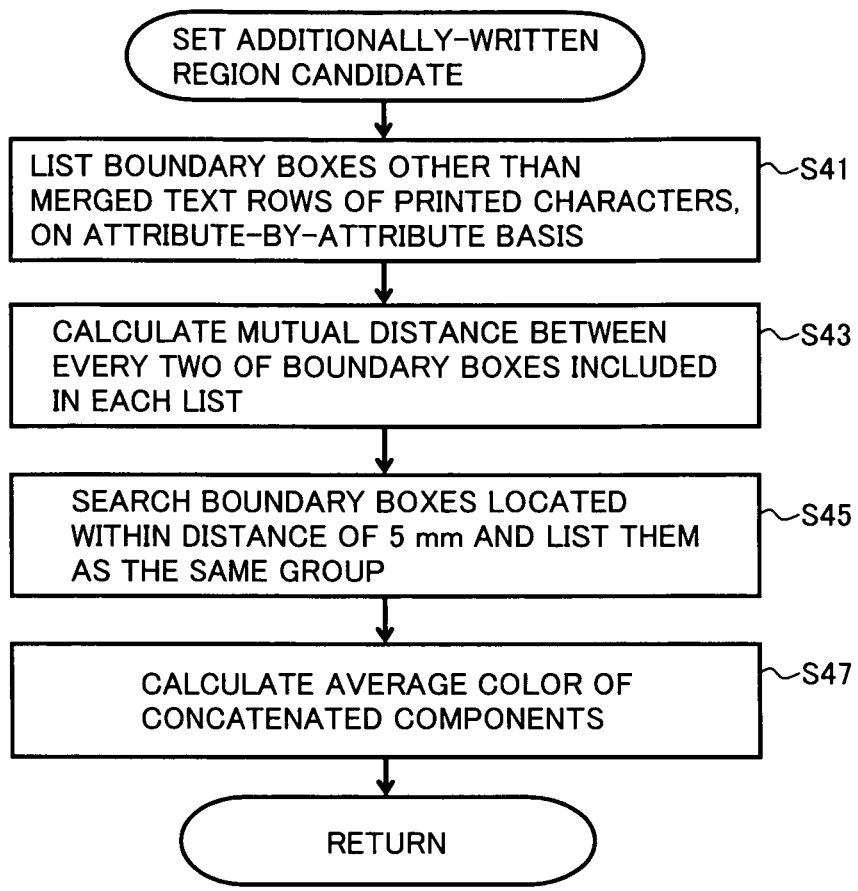
FIG. 10 is a flowchart showing a practical example of additionally-written region candidate setting processing in step S33.

In step S33, as specifically shown in FIG. 10, additionally-written region extraction unit 2 temporarily stores, in a prescribed storage region of storage unit 20, the boundary boxes other than the merged text rows identified in the above-described step S31 as the merged text rows representing text, such that they are sorted on an attribute-by-attribute basis (step S41). This processing is hereinafter referred to as "listing". Furthermore, additionally-written region extraction unit 2 calculates a mutual distance between every two of the boundary boxes included in each list (step S43), concatenates the boundary boxes located within a prescribed distance as the same group, and lists these boundary boxes (step S45). Specifically, the prescribed distance is herein set to be 5 mm. Furthermore, an average color of the components concatenated in step S45 is calculated (step S47).

Figure 11:
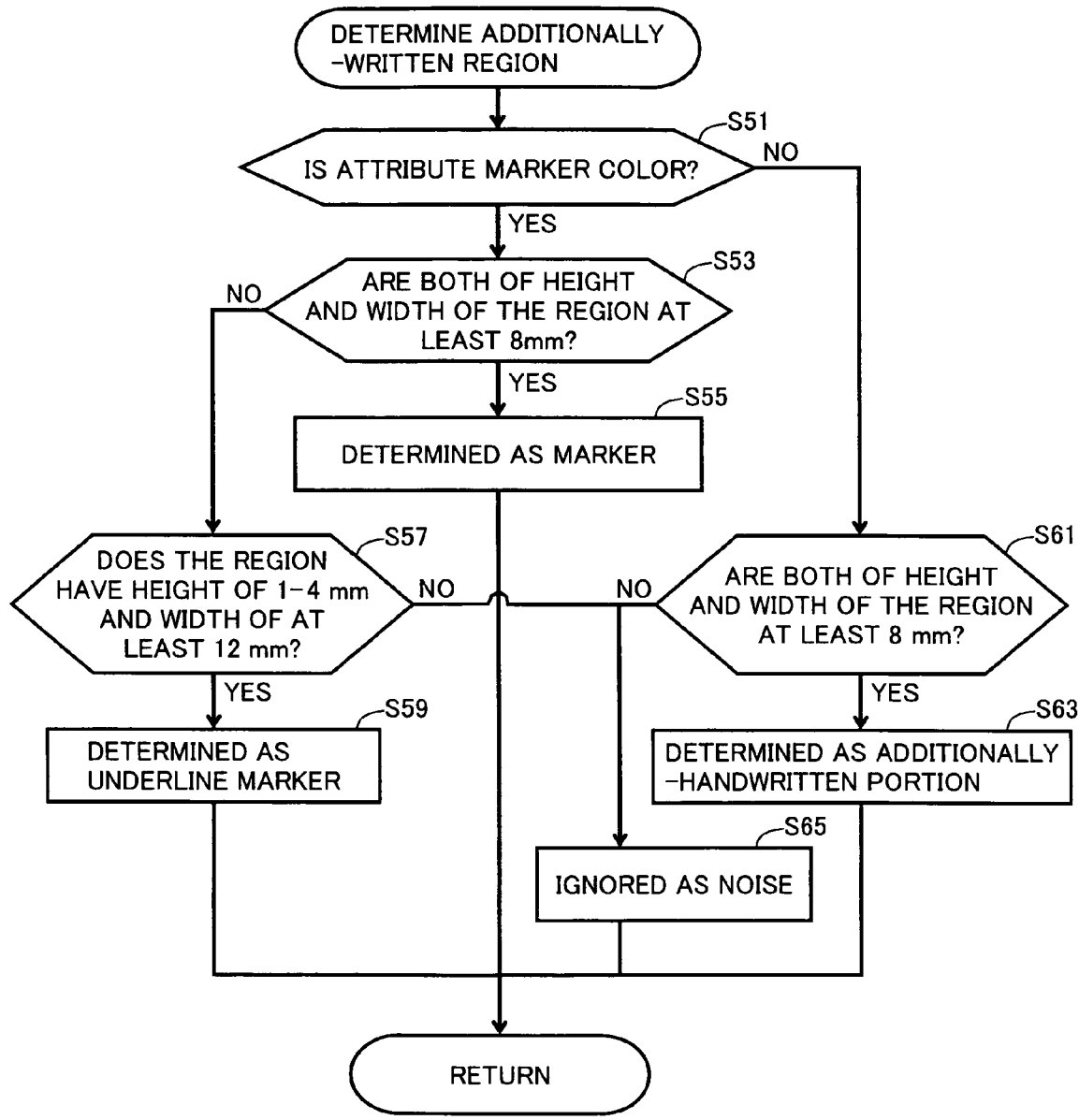
FIG. 11 is a flowchart showing a practical example of additionally-written region determining processing in step S35.

Next, as to each of the additionally-written region candidates set in the above-described step S33, additionally-written region extraction unit 2 determines an additionally-written region and its additional writing type, based on its attribute and size (step S35). Specifically, with reference to FIG. 11, if an attribute of the additionally-written region candidate set in step S33 is a marker color, and both of a height and a width of its region are at least 8 mm, which is a practical example of the prescribed size (YES in step S51, and YES in step S53), additionally-written region extraction unit 2 determines that the relevant additionally-written region candidate is an additionally-written region, and that its additional writing type is a marker (step S55). In FIG. 9, region 301 is determined as an additionally-written region, and its additional writing type is determined as a marker.

If an attribute of the additionally-written region candidate set in step S33 is a marker color, and its region has a height of 1-4 mm, which is a practical example of the prescribed size, and has a width of at least 12 mm, which is a practical example of the prescribed size (YES in step S51, NO in step S53, and YES in step S57), additionally-written region extraction unit 2 determines that the relevant additionally-written region candidate is an additionally-written region, and that its additional writing type is an underline marker (step S59). In FIG. 9, regions 305A and 305B are determined as additionally-written regions, and their additional writing type is determined as an underline marker.

If an attribute of the additionally-written region candidate set in step S33 is not a marker color, and both of a height and a width of its region are at least 8 mm, which is a practical example of the prescribed size (NO in step S51, and YES in step S61), additionally-written region extraction unit 2 determines that the relevant additionally-written region candidate is an additionally-written region, and that its additional writing type is an additionally-handwritten portion (step S63). In FIG. 9, region 303 is determined as an additionally-written region, and its additional writing type is determined as an additionally-handwritten portion.

In the present practical example, additionally-written region extraction unit 2 determines that a type of an additionally-written region is an additionally-handwritten portion, based on a size of the additionally-written region candidate. However, a type of an additionally-written region may be determined as an additionally-handwritten portion by utilizing differences between a characteristic of handwriting and a characteristic of a printed character. Examples of specific characteristics may include an orientation, a width, and linearity of each line, an angle between lines at an intersection or a node, symmetry, and others in each boundary box in a character region. Additionally-written region extraction unit 2 may determine that a type of the additionally-written region is an additionally-handwritten portion, by comparing these characteristics with prescribed reference values, respectively. Alternatively, as another practical example of the determination made by utilizing differences between handwriting and a printed character, a type of the additionally-written region may also be determined as a seal, a stamp, or the like.

As to an additionally-written region candidate that fails to meet any of the above-described conditions (NO in step S57, or NO in step S61), additionally-written region extraction unit 2 determines that the relevant additionally-written region candidate is a noise, and ignores it in the subsequent processing (step S65). In FIG. 9, region 307 is determined as a noise, and ignored in the subsequent processing.

In the practical examples of the additionally-written region extraction processing in the above-described step S07, the method as described in Japanese Laid-Open Patent Publication No. 2002-319025 may also be adopted. However, any other methods may be adopted as long as they enable extraction of an additionally-written region. For example, it may be possible to determine whether or not the additionally-written region is a text region representing printed characters, by determining characteristic amounts that reflect characteristics as to an orientation, a width, and linearity of each line, an angle between lines at an intersection or a node, symmetry, and others in each boundary box in a character region, and comparing the characteristic amounts with reference values, respectively.

Furthermore, in the practical example of the above-described extraction processing, it is determined whether or not an additionally-written region candidate is an additionally-written region, based on whether an attribute of the relevant additionally-written region candidate is a marker color or not. However, such a determination may be made based on specific types of marker color (red or blue). Furthermore, in the above-described practical example, additionally-written region extraction unit 2 makes a determination as to whether an additionally-written region candidate is an additionally-written region or not, a determination as to an additional writing type, and others. However, whether an additionally-written region candidate is an additionally-written region or not, a determination as to an additional writing type, and others may be designated by a user manipulation via manipulation panel 25, or alternatively, modified.

Returning to the flowchart in FIG. 3, additionally-written region extraction unit 2 produces annotation data for the additionally-written region determined and extracted in the processing in the above-described step S07. Additionally-written region extraction unit 2 then calculates a size of a region for inserting the data into PDF data as an annotation, and a position where the data is displayed, on the PDF data, and sets the size and the position for the annotation data (step S09). In the following description, a region on PDF data for inserting the annotation data thereinto as an annotation is referred to as an "annotation region", and a size of the region on PDF data for inserting the data into the PDF data as an annotation, and a position where the data is displayed are referred to as an "annotation frame".

Figure 12:
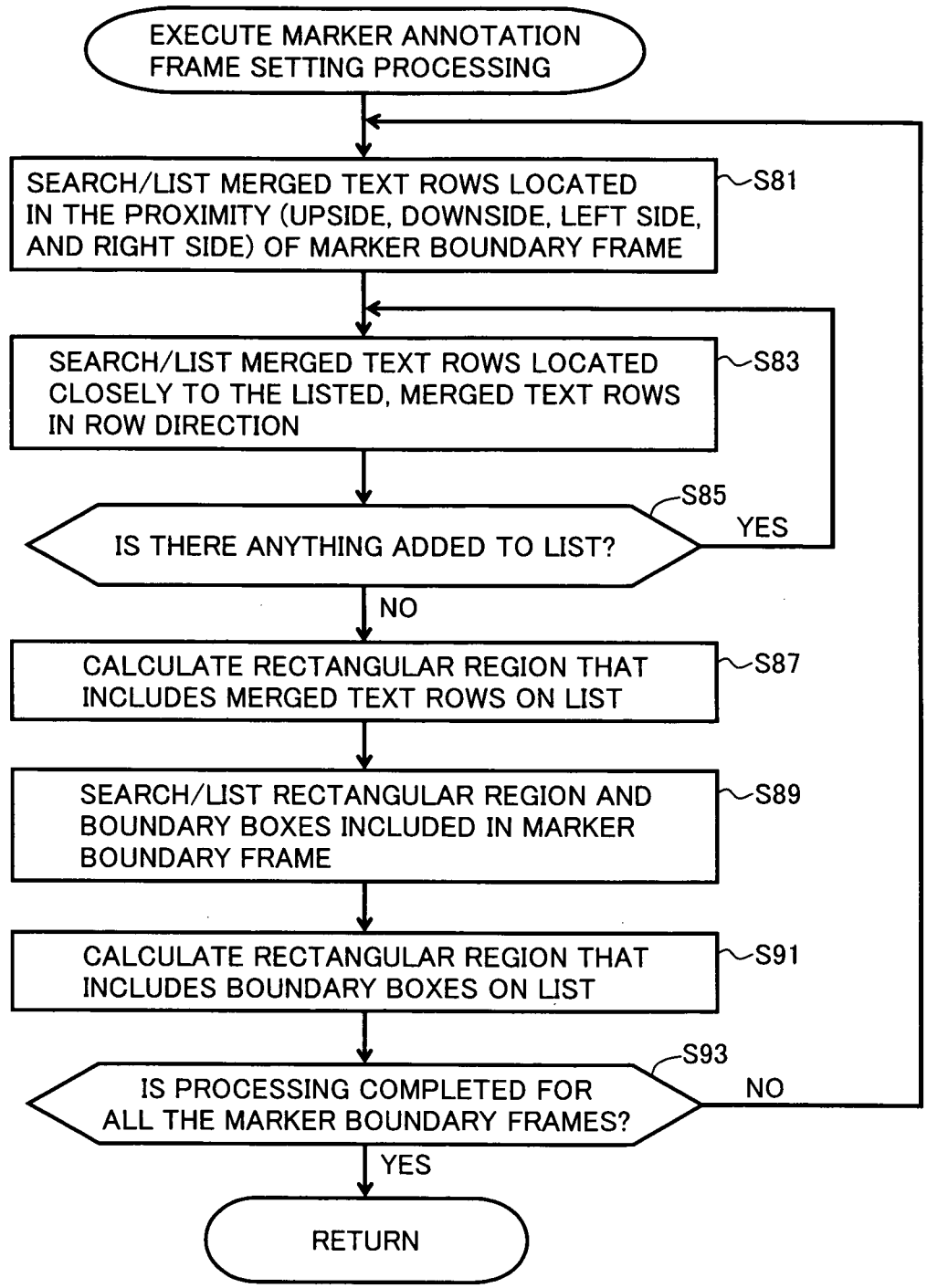
FIG. 12 is a flowchart showing a practical example of annotation frame setting processing in step S09, in the case where an additional writing type is a marker.
Figure 13A:
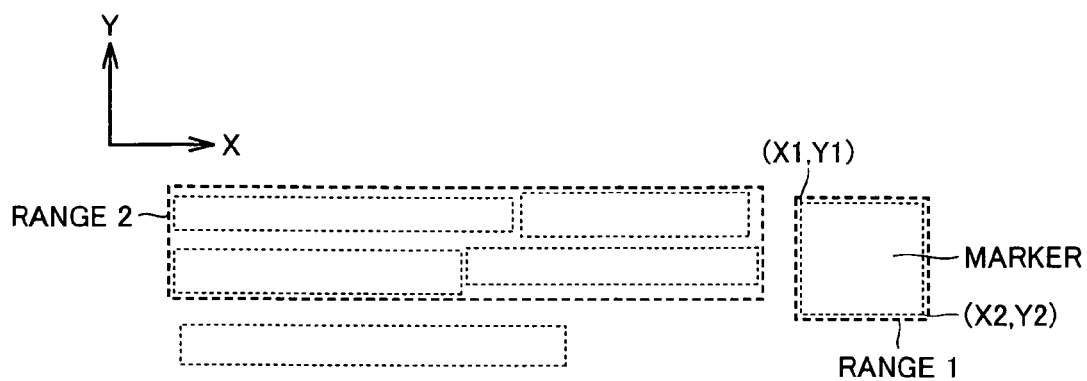
FIGS. 13A and 13B are drawings for specifically describing the annotation frame setting processing in the case where an additional writing type is a marker.
Figure 13B:
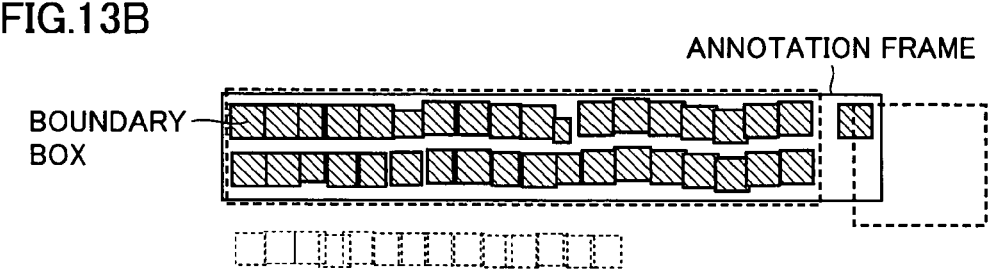

Specifically, as to the additionally-written region, an additional writing type of which is determined as a marker in the above-described step S55, there will be provided a description with reference to FIGS. 12, 13A and 13B.

With reference to FIG. 12, additionally-written region extraction unit 2 searches for merged text rows located in the proximity of the relevant additionally-written region, and lists them (step S81). As shown in FIG. 13A, if the additionally-written region (region 301), which is a marker, is shown by (X1,Y1)–(X2,Y2), additionally-written region extraction unit 2 lists merged text rows located in a range 1, which is a range that includes a region of the boundary frame and is larger than the relevant region by not more than 5 mm in upward and downward, or leftward and rightward directions of the relevant region.

The above-described features, which will be described in further detail, have the following meaning. Specifically, range 1 is a band-like range that is obtained by enlarging the additionally-written region, which is a marker, in the leftward and rightward directions, with the upper and lower sides thereof located outward by 5 mm, or a band-like range that is obtained by enlarging the additionally-written region described above in the upward and downward directions, with the left and right sides thereof located outward by 5 mm. In the example in FIG. 13A, there are listed in step S81 four merged text rows in total: two upper and lower merged text rows included in the former range as to region 301 and located immediately leftward of region 301; and two merged text rows included in the former range as to region 301 and located immediately leftward of the upper and lower merged text rows described above, respectively.

Furthermore, additionally-written region extraction unit 2 searches for and picks out merged text rows located closely to each merged text listed in step S81 in the row direction, and lists them (step S83). In the example of FIG. 13A, it eventually means that merged text rows in a range 2 are listed. Range 2 corresponds to a range having an outline obtained by enlarging outermost outlines of the merged text rows, which are picked out in relation to a marker of the additionally-written region (region 301) (X1,Y1)–(X2,Y2), which is a marker, by not more than 5 mm in the leftward and rightward directions.

The above-described features, which will be described in further detail, have the following meaning. Specifically, as previously described, four merged text rows located leftward of region 301 are listed in the above-described step S81. In this case, range 2 is a range obtained by enlarging an outline of the four merged text rows listed in step S81 in the leftward and rightward directions by 5 mm, as shown in FIG. 13A. In step S83, there are listed four merged text rows, which are the same as the four merged text rows listed in step S81.

The processing in the above-described step S83 is repeated until all the relevant merged text rows are searched for and listed. If all the merged text rows are listed (NO in step S85), additionally-written region extraction unit 2 calculates a maximum value and a minimum value in each of upward, downward, leftward, and rightward directions as to all the merged text rows listed in step S83, and calculates a rectangular region that includes all these merged text rows (step S87). Additionally-written region extraction unit 2 then searches for boundary boxes included in the rectangular region calculated in step S87 and the additionally-written region, which is a marker, and lists the boundary boxes (step S89). FIG. 13B shows the listed boundary boxes in a hatched manner. Additionally-written region extraction unit 2 calculates a maximum value and a minimum value in each of upward, downward, leftward, and rightward directions as to all the boundary boxes listed in step S89, and calculates a rectangular region that includes all these boundary boxes, and sets the rectangular region as an annotation frame (step S91). In FIG. 13B, the annotation frame is shown by a bold line.

Additionally-written region extraction unit 2 executes the above-described processing on all the additionally-written regions, each of which is a marker, included in the source document (NO in step S93), and terminates the processing.

Figure 20A:
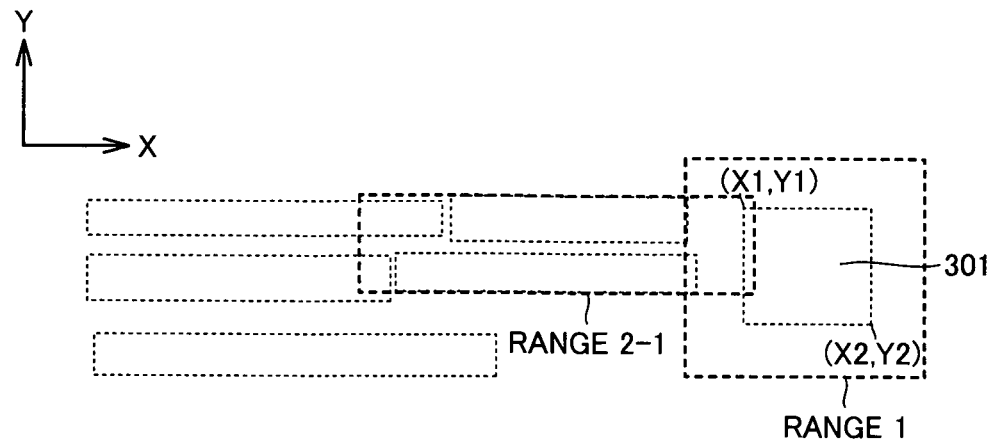
FIGS. 20A, 20B and 20C are drawings for specifically describing another example of the annotation frame setting processing in the case where an additional writing type is a marker.
Figure 20B:
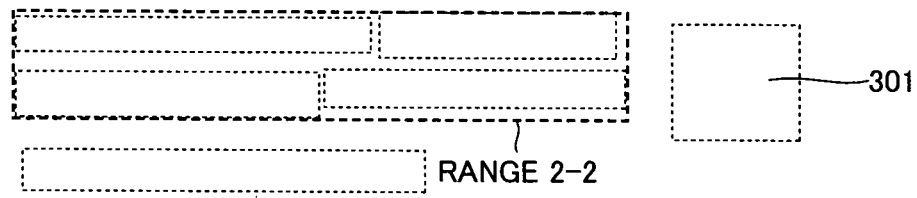
Figure 20C:
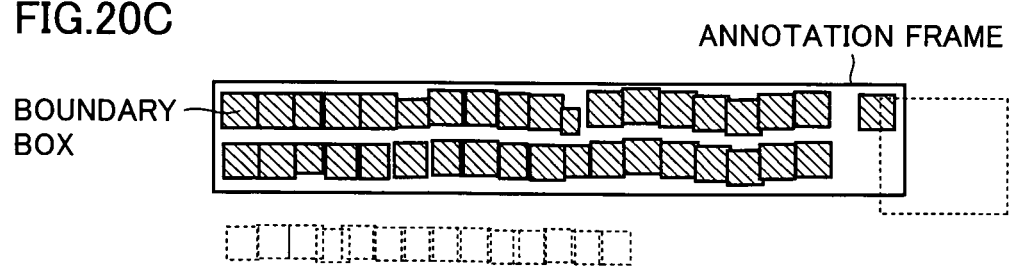

Another practical example of the annotation frame setting processing in the case where an additional writing type is a marker will be described with reference to FIG. 20. In the above-described step S81, range 1 shown in FIG. 20A is set. Range 1 is a range including the additionally-written region (region 301), which is a marker, and obtained by enlarging the additionally-written region described above by 5 mm in each of the upward and downward directions, and in each of the leftward and rightward directions. Two upper and lower merged text rows included in range 1 and located immediately leftward of region 301 are listed. Next, in step S83, a range 2-1 shown in FIG. 20A is set. Range 2-1 is a range obtained by enlarging an outline of the two merged text rows listed in step S81 in the leftward and rightward directions by 5 mm. There are listed four merged text rows in total: the merged text rows included in range 2-1 and listed in step S81; and two merged text rows included in range 2-1 and located immediately leftward of the above-described merged text rows, respectively. Next, in step S87, a maximum value and a minimum value in each of the upward, downward, leftward, and rightward directions as to all the merged text rows (the above-described four merged text rows) listed in step S83 are calculated, and there is calculated a range 2-2 that is shown in FIG. 20B and includes all these merged text rows. Afterwards, there are listed in step S89 boundary boxes included in range 2-2 and the additionally-written region (region 301), which is a marker. FIG. 20C shows the boundary boxes listed in step S89 in a hatched manner. In step S91, a maximum value and a minimum value in each of the upward, downward, leftward, and rightward directions as to all the boundary boxes listed in step S89 are calculated, and a rectangular region that includes all these boundary boxes is calculated and set as an annotation frame. FIG. 20C shows the annotation frame by a bold line.

Figure 14:
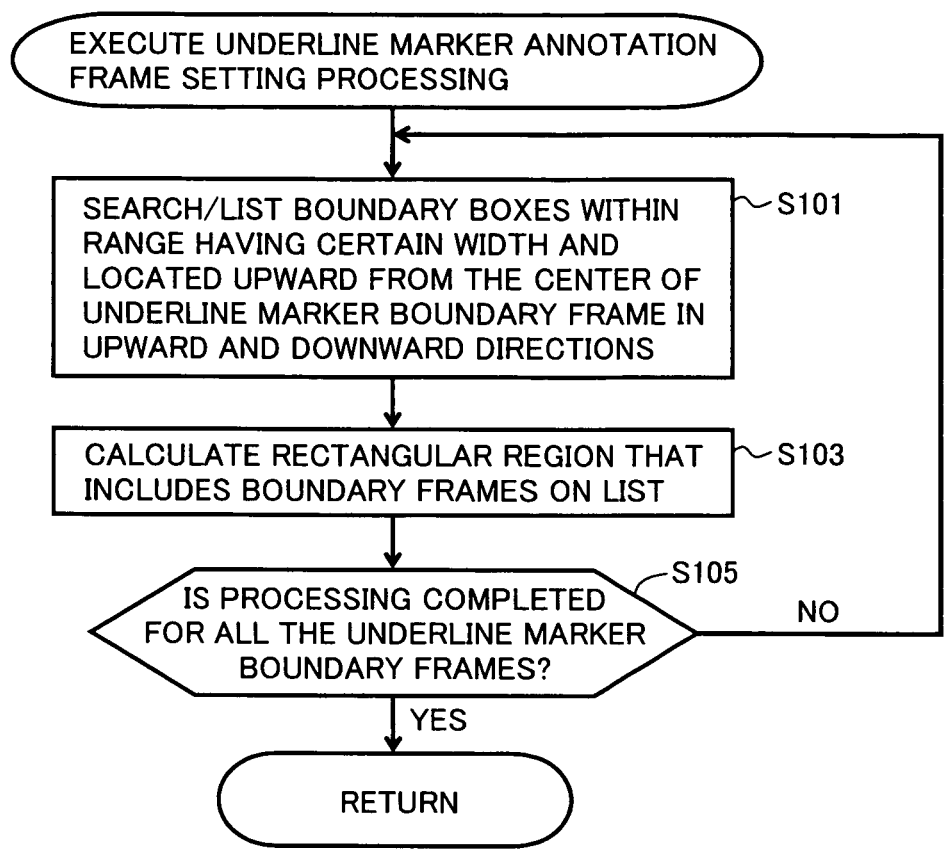
FIG. 14 is a flowchart showing a practical example of the annotation frame setting processing in step S09, in the case where an additional writing type is an underline marker.
Figure 15A:
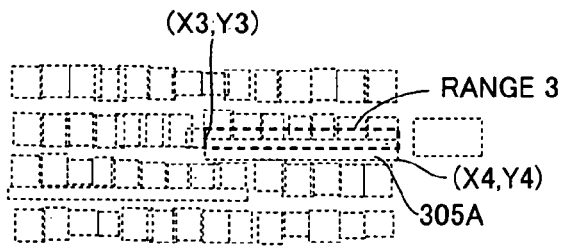
FIGS. 15A, 15B are drawings for specifically describing the annotation frame setting processing in the case where an additional writing type is an underline marker.
Figure 15B:
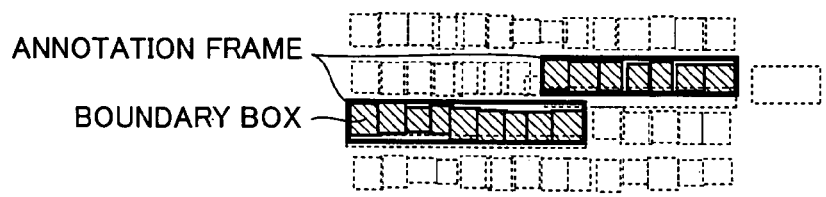

Furthermore, as to the additionally-written region, an additional writing type of which is determined as an underline marker in the above-described step S55, there will be provided a description with reference to FIGS. 14, 15A and 15B.

With reference to FIG. 14, additionally-written region extraction unit 2 searches for boundary boxes located in the proximity of the relevant additionally-written region, and lists them (step S101). As shown in FIG. 15A, if the additionally-written region (region 305A), which is an underline marker, is shown by (X3, Y3)–(X4, Y4), additionally-written region extraction unit 2 sets (Y3+Y4)/2, which is the center of the boundary frame in upward and downward directions, as a base, and lists boundary boxes located within a range 3, which is a rectangular range having a certain width from the base in the upward direction, such as having a height of 5 mm from the base. FIG. 15B shows the boundary boxes listed as to region 305A in a hatched manner. Additionally-written region extraction unit 2 calculates a maximum value and a minimum value in each of upward, downward, leftward, and rightward directions as to all the boundary boxes listed in step S101, calculates a rectangular region that includes all these boundary boxes, and sets the rectangular region as an annotation frame (step S103). In FIG. 15B, the annotation frame as to region 305A is shown by a bold line.

Additionally-written region extraction unit 2 executes the above-described processing on all the additionally-written regions, each of which is an underline marker, included in the source document (NO in step S93), and terminates the processing. In the practical example shown in FIG. 15A, another additionally-written region, which is an underline marker, is also included in addition to the additionally-written region, which is an underline marker, shown by (X3, Y3)–(X4, Y4), and hence the above-described processing is repeated. Note that FIG. 15B shows the boundary boxes listed as to the additionally-written region (region 305B), which is an underline marker, in a hatched manner on the left side, and shows the annotation frame as to region 305B by a bold line on the left side.

Figure 16:
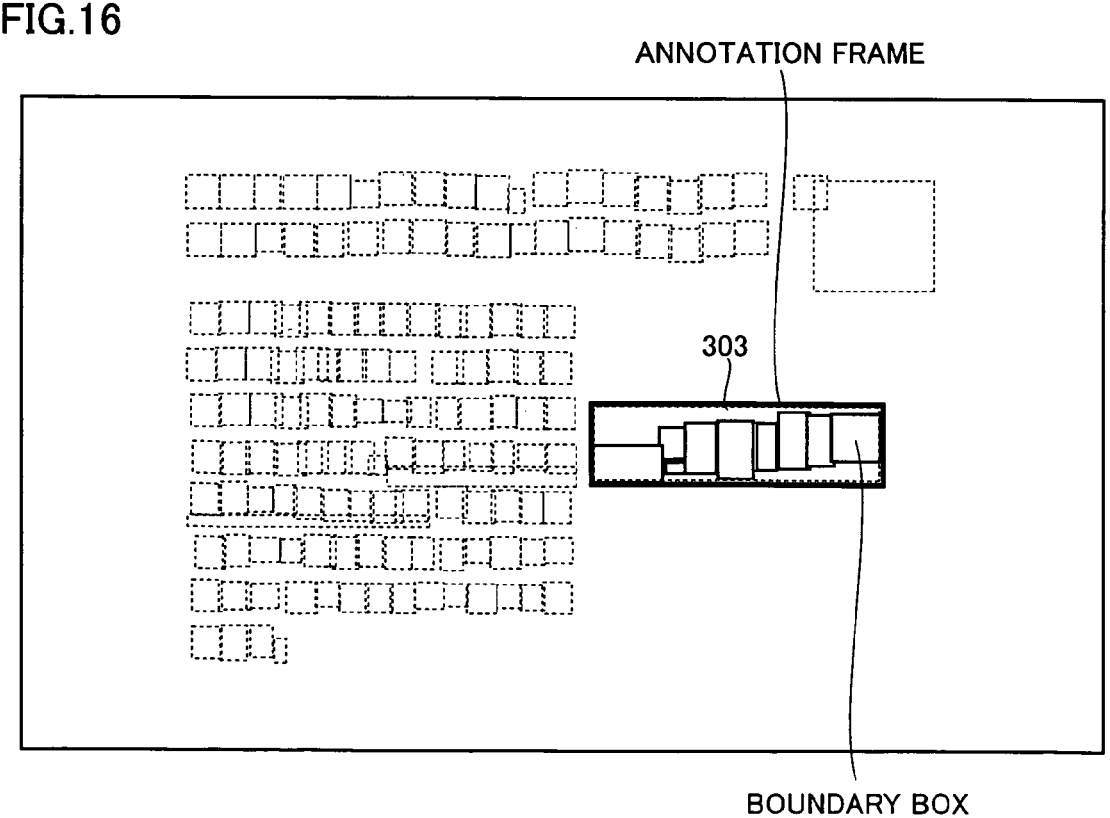
FIG. 16 is a drawing for specifically describing the annotation frame setting processing in the case where an additional writing type is an additionally-handwritten portion.

If it is determined in the above-describes step S55 that an additional writing type is an additionally-handwritten portion, additionally-written region extraction unit 2 sets a rectangular region that includes the additionally-written region, which is an additionally-handwritten portion, as an annotation frame, as shown in FIG. 16. In the practical example shown in FIG. 16, the boundary boxes included in the additionally-written region (region 303), which is an additionally-handwritten portion, are shown by a solid line, and a rectangular region that includes region 303 including these boundary boxes, namely, the set annotation frame, is shown by a bold line.

When the annotation frame is set as described above in the step S09 above, annotation data production unit 6 analyzes information on the additionally-written region and produces annotation data (step S11). If a source document to be processed is the document shown in FIG. 4, the annotation data as shown in FIG. 17 is produced in step S11. Specifically, annotation data production unit 6 analyzes a "comment" that indicates a type of the relevant additionally-written region, a position of its additionally-written portion on a source document, a "type" that indicates a form type of the additionally-written region, a "transparency" that indicates a transmittance of a text region at an overlaid portion of the additionally-written region and the text region in the source document, and presence or absence of attached data, and produces annotation data that includes them as shown in FIG. 17. As to the "type", which is a form type of the additionally-written region, if an additional writing type is determined as a handwritten portion, the "type" is set as a "stamp", and in another case, set as a rectangular. As to the "transparency", if an additional writing type is determined as an additionally-handwritten portion, the "transparency" is set as "100%", and in another case, set as "0%". Furthermore, as a stamp that indicates a content of the additionally-handwritten portion, a relevant portion of the additionally-written region is cut out from the image data, and set as bit map data. Note that the annotation data shown in FIG. 17 is merely an example, and the present invention is not limited to this practical example. Furthermore, although annotation data production unit 6 analyzes information on the additionally-written region and produces annotation data in the present practical example, annotation data may be designated by a user manipulation via manipulation panel 25. Alternatively, the produced annotation data may be modified.

Figure 18:
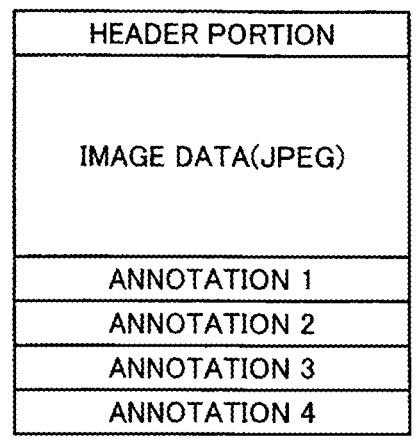
FIG. 18 is a drawing that shows a practical example of a configuration of PDF data.

The annotation data produced in step S11 and the image data in the JPEG form compressed in PEG compression unit 7 are converted into PDF data in PDF conversion unit 8 (step S13): If an annotation data is the one shown in FIG. 17, PDF data that includes annotation data and image data is produced in step S13, as in the practical configurational example of the PDF data shown in FIG. 18. The produced PDF data is transmitted to a prescribed transmission destination by transmission unit 9 (step S15).

Figure 19:
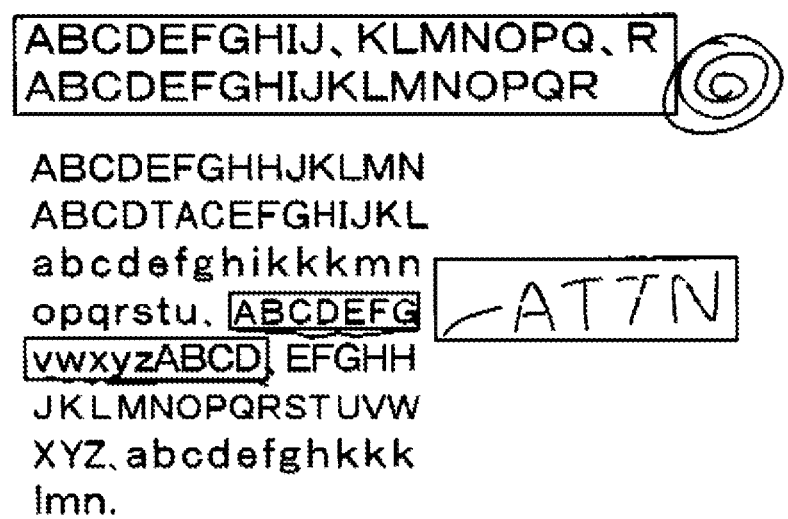
FIG. 19 is a drawing for specifically describing a position where an annotation is added in the PDF data.

The PDF data transmitted in step S15 is displayed by a viewer in an apparatus at the transmission destination, so that an annotation is displayed by being added to a position shown by a rectangular in FIG. 19.

The above-described electronic document data creation processing is executed in image forming apparatus 1 according to the present embodiment, so that it is possible to add an annotation, which is based on an additionally-written portion to the source document, to the produced electronic document data in a necessary position, without complicated manipulation to image forming apparatus 1. As a result, it is possible to increase browsing capability of an electronic document such as a produced PDF document. Furthermore, utilization of an annotation is increased. In the above-described practical example, annotation data in the form of PDF data is produced and embedded in PDF data serving as an electronic document. However, the present invention can also be applied to a browsing support function such as a "bookmark", a "thread", or a "link", instead of the annotation data, serving as an object to be embedded. Application of the present invention thereto can also increase browsing capability of an electronic document such as a produced PDF document, in a similar manner.

Furthermore, in the above-described processing, an additionally-written region is extracted by using differences between a characteristic of handwriting and a characteristic of a printed character, and hence the additionally-written region can be extracted with high accuracy.

Furthermore, in the above-described processing, a marker color is detected by calculating an average color of concatenated components in a boundary box, and hence an additionally-written region can be distinguished by utilizing the marker color. Accordingly, a user can set an annotation in a text region of printed characters by utilizing the marker color.

Furthermore, in the above-described processing, an annotation frame is set by searching for merged text rows located in the proximity of a region determined as an additionally-written region. It is thereby possible in the electronic document data to adequately set an annotation to the text region intended by the user, who has additionally written to the source document.

Furthermore, in the above-described processing, a bit map data that represents a content of an additionally-handwritten portion is produced by cutting out an additionally-written region from image data that has been obtained by reading the source document data, and included in an annotation data. Accordingly, it is possible to retrieve the annotation data from the electronic document data and utilize it. For example, it is possible to capture an annotation data produced from a source document that has an additionally-written portion, into electronic document data produced from a source document that has no additionally-written portion.

Furthermore, it is also possible to provide a program for causing a computer to execute the electronic document data creation processing that is to be executed in image forming apparatus 1 according to the present embodiment. Such a program may also be provided as a program product by being recorded in a computer-readable medium such as a flexible disk attached to a computer, Compact Disk-Read Only Memory (CD-ROM), Read Only Memory (ROM), RAM, or a memory card. Alternatively, the program may also be provided by being recorded in a medium such as a hard disk embedded in a computer. Alternatively, the program may also be provided by being downloaded via a network.

Note that the program according to the present invention may be the one that invokes necessary modules in a prescribed arrangement and at prescribed timing from program modules provided as a part of an operating system (OS) of the computer, and causes the computer to execute processing. In such a case, the program itself does not include the above-described modules, and the program cooperates with the OS to execute processing. Such a program that does not include a module can also be involved in the program according to the present invention.

Alternatively, the program according to the present invention may also be the one that is provided by being incorporated in a part of another program. In such a case again, the program itself does not include a module included in the other program above, and the program cooperates with the other program to execute processing. Such a program that is incorporated in another program can also be involved in the program according to the present invention.

The program product to be provided is installed in a program storing unit such as a hard disk, for execution. Note that the program product includes a program itself and a recording medium that records the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a read unit configured to read an image of a source document and obtain image data;
   an electronic document production unit configured to produce electronic document data for allowing a display apparatus to display said image data thereon, based on said image data;
   an extraction unit configured to extract from said image data an additionally-written region including an additional portion, and configured to identify the additional portion and distinguish the additional portion by associating the additional portion with a unique identifier corresponding to a plurality of different types or attributes;
   an annotation data production unit configured to produce annotation data based on said additionally-written region, and configured to inspect the unique identifier corresponding to the plurality of types or attributes, and based on the unique identifier, execute different processing for each produced annotation data having a corresponding unique identifier; and;
   a setting unit configured to calculate a position for allowing said display apparatus to display said annotation data on said electronic document data, based on a position of said additionally-written region on said image data, and setting the calculated position for said annotation data.

2. The image forming apparatus according to claim 1, wherein said extraction unit includes a first identification unit identifying a character region from said image data, a calculation unit calculating a characteristic amount of said character region as an attribute of said character region, and a second identification unit identifying a region which includes an additionally-handwritten portion in said character region, as said additionally-written region.

3. The image forming apparatus according to claim 2, wherein said attribute is a color of said character region.

4. The image forming apparatus according to claim 1, wherein said extraction unit includes a first identification unit identifying a character region from said image data, and said setting unit includes a third identification unit identifying a region associated with said additionally-written region, in said character region.

5. The image forming apparatus according to claim 4, wherein said third identification unit sets a prescribed range located leftward and rightward or upward and downward with respect to the position of said additionally-written region, as a search range, and identifies said character region located within said search range as the region associated with said additionally-written region.

6. The image forming apparatus according to claim 5, wherein said extraction unit includes a unit calculating a characteristic amount of said character region as an attribute of said character region, and said third identification unit determines said search range in accordance with said attribute of said additionally-written region.

7. The image forming apparatus according to claim 5, wherein said extraction unit further includes a unit calculating a characteristic amount of said character region as an attribute of said character region, and a unit determining an additional writing type based on a size of said additionally-written region, and said third identification unit determines said search range in accordance with said attribute of said additionally-written region and said additional writing type of said additionally-written region.

8. The image forming apparatus according to claim 1, wherein said annotation data production unit includes a unit cutting out said additionally-written region from said image data, and produces said annotation data, based on said cut-out, additionally-written region.

9. The image forming apparatus according to claim 1, wherein said electronic document data is Portable Document Format (PDF) data.

10. The image forming apparatus according to claim 1, wherein said different types or attributes include at least two types selected from among a marker, an underline marker, and a handwriting, said types classified based on an attribute and a size of an extracted region candidate.

11. A method of creating electronic document data based on image data obtained by reading an image of a source document, comprising the steps of:
- extracting from said image data an additionally-written region including an additional portion, and identifying the additional portion, and distinguishing the additional portion by associating the additional portion with a unique identifier corresponding to a plurality of different types or attributes;
- producing annotation data based on said additionally-written region, and inspecting the unique identifier corresponding to the plurality of types or attributes, and based on the unique identifier, executing different processing for each produced annotation data having a corresponding unique identifier; and
- calculating a position for allowing a display apparatus to display said annotation data on said electronic document data, based on a position of said additionally-written region on said image data, and setting the calculated position for said annotation data.

12. A non-transitory computer readable medium which records a program causing a computer to execute electronic document data creation processing of creating electronic document data based on image data obtained by reading an image of a source document, the program causing said computer to execute the processing including the steps of:
- extracting from said image data an additionally-written region including an additional portion, and identifying the additional portion, and distinguishing the additional portion by associating the additional portion with a unique identifier corresponding to a plurality of different types or attributes;
- producing annotation data based on said additionally-written region, and inspecting the unique identifier corresponding to the plurality of types or attributes, and based on the unique identifier, executing different processing for each produced annotation data having a corresponding unique identifier; and
- calculating a position for allowing a display apparatus to display said annotation data on said electronic document data, based on a position of said additionally-written region on said image data, and setting the calculated position for said annotation data.

* * * * *